United States Patent
Twist

(10) Patent No.: US 9,746,108 B2
(45) Date of Patent: Aug. 29, 2017

(54) COMPOSITE UNDERGROUND PIPE STRUCTURE

(71) Applicant: W.E. Hall Company, Inc., Newport Beach, CA (US)

(72) Inventor: Jordan Twist, Newport Beach, CA (US)

(73) Assignee: W.E. Hall Company, Inc., Newport Beach, CA (US)

( * ) Notice: Subject to any disclaimer, the term of this patent is extended or adjusted under 35 U.S.C. 154(b) by 146 days.

(21) Appl. No.: 14/632,638

(22) Filed: Feb. 26, 2015

(65) Prior Publication Data

US 2015/0252917 A1    Sep. 10, 2015

Related U.S. Application Data

(60) Provisional application No. 61/947,744, filed on Mar. 4, 2014.

(51) Int. Cl.

| | |
|---|---|
| *F16L 9/14* | (2006.01) |
| *F16L 9/147* | (2006.01) |
| *F16L 9/06* | (2006.01) |
| *B32B 1/00* | (2006.01) |
| *E03F 3/04* | (2006.01) |
| *B32B 15/00* | (2006.01) |
| *B32B 15/04* | (2006.01) |
| *B32B 15/08* | (2006.01) |
| *B32B 15/085* | (2006.01) |
| *B32B 27/00* | (2006.01) |
| *B32B 27/06* | (2006.01) |
| *B32B 27/28* | (2006.01) |
| *B32B 27/32* | (2006.01) |

(Continued)

(52) U.S. Cl.
CPC .............. *F16L 9/147* (2013.01); *B32B 1/00* (2013.01); *B32B 1/08* (2013.01); *B32B 3/00* (2013.01); *B32B 3/02* (2013.01); *B32B 3/28* (2013.01); *B32B 3/30* (2013.01); *B32B 15/00* (2013.01); *B32B 15/04* (2013.01); *B32B 15/08* (2013.01); *B32B 15/085* (2013.01); *B32B 27/00* (2013.01); *B32B 27/06* (2013.01); *B32B 27/28* (2013.01); *B32B 27/32* (2013.01); *E03F 3/04* (2013.01); *F16L 9/06* (2013.01); *B32B 2597/00* (2013.01)

(58) Field of Classification Search
CPC .......... F16L 9/133; F16L 11/08; F16L 11/125
USPC ....... 138/133, 134, 143, 146, 138, 153, 122; 428/36.91
See application file for complete search history.

(56) References Cited

U.S. PATENT DOCUMENTS 4,107,370 A * 8/1978 Ingraham ................. B05D 7/20
427/409
4,237,186 A * 12/1980 Ingraham ................. B05D 7/20
264/129

(Continued)

FOREIGN PATENT DOCUMENTS

KR         100312859       11/2001
WO      WO2014/168268    10/2014

*Primary Examiner* — Patrick F Brinson
(74) *Attorney, Agent, or Firm* — Stetina Brunda Garred & Brucker

(57) ABSTRACT

A composite pipe structure including a pair of structural polymer layers disposed on opposed sides of a central metal layer. In a preferred embodiment, the thickness of the composite structure is comprised of approximately 40%-60% of the metal layer, with the remaining balance comprised of the pair of polymer layers.

18 Claims, 2 Drawing Sheets

(51) Int. Cl.
*B32B 1/08* (2006.01)
*B32B 3/00* (2006.01)
*B32B 3/02* (2006.01)
*B32B 3/28* (2006.01)
*B32B 3/30* (2006.01)

(56) References Cited

U.S. PATENT DOCUMENTS

| | | | | |
|---|---|---|---|---|
| 4,691,740 | A * | 9/1987 | Svetlik | B29C 49/26 138/104 |
| 5,848,618 | A * | 12/1998 | Guest | F16L 11/04 138/121 |
| 6,546,963 | B2 * | 4/2003 | Nuss | F16L 9/147 138/133 |
| 6,604,552 | B2 * | 8/2003 | Hansen | F16L 9/147 138/140 |
| 6,959,736 | B2 * | 11/2005 | Jarvenkyla | B29C 44/022 138/127 |
| 7,434,599 | B2 * | 10/2008 | Sasai | F16L 9/147 138/138 |
| 8,091,588 | B2 * | 1/2012 | Burke, II | F16L 9/02 138/109 |
| 2011/0135884 | A1 * | 6/2011 | Lettow | B32B 1/04 428/174 |

* cited by examiner

COMPOSITE UNDERGROUND PIPE STRUCTURE

CROSS-REFERENCE TO RELATED APPLICATIONS

This application claims the benefit of U.S. Provisional Application Ser. No. 61/947,744, filed Mar. 4, 2014, the contents of which are expressly incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates generally to underground pipe for use in sewers, storm drains, pen stocks, culverts and the like, and more specifically to a composite pipe structure including a metal core interposed between a pair of polymer layers providing structural support to the pipe.

2. Description of the Related Art

Metal pipe has been widely used for draining, culverts and other similar fluid conduits. Although susceptible to abrasion, there are several advantages associated with metal pipe over conventional concrete pipe, due to its comparatively high strength and low weight. These characteristics render metal pipe relatively inexpensive to manufacture, ship and handle while permitting its use in applications which require it to support substantial soil overburden. Moreover, metal pipe may achieve enhanced structural characteristics by forming the pipe to include corrugations or ribs.

One deficiency of metal pipe is that it is susceptible to corrosion and excessive abrasion, and therefore, use of metal pipe may be restricted primarily to culvert and storm drain applications. In storm drain applications, such metal pipe is particularly susceptible to extensive abrasion caused by the movement of gravel, dirt, sand, etc. therethrough. Such excessive abrasion frequently degrades metal pipe to a point where leakage of the contents of the pipe therefrom becomes a major concern. Additionally, such abrasion may, in some instances, be sufficient to adversely affect the structural integrity of the pipe, and consequently result in structural failure of the pipe wherein the overburden crushes a portion of the pipe, thereby effectively plugging the pipe and substantially reducing or eliminating flow therethrough.

In addition to the foregoing, conventional metal pipe used in buried storm drain applications frequently encounters substantial problems associated with its operational environment. More specifically, the pipe experiences abrasion during the process of back-filling the gravel and dirt on top of the buried pipe, wherein the metal may be scratched or damaged during the back-filling process. Furthermore, long term exposure of the exterior of the metal pipe within the burial environment may serve to corrode the exterior of the pipe while water and debris flowing through the interior of the metal pipe degrades the pipe through abrasion.

Accordingly, there is a need in the art for an improved pipe structure, which protects the metal used in forming the pipe, while at the same time, reducing the overall cost of the pipe.

BRIEF SUMMARY OF THE INVENTION

In accordance with one embodiment of the present invention, there is provided a composite pipe structure including a pair of structural polymer layers disposed on opposed sides of a central metal layer. In a preferred embodiment, the thickness of the composite structure is comprised of approximately 40%-60% of the metal layer, with the remaining balance of the composite structural thickness is comprised of the pair of polymer layers.

The composite nature of the pipe provides several advantages over conventional metal pipes. In particular, the composite pipe tends to weigh less than conventional pipes since a portion of the metal used in conventional pipes is substituted with a generally lighter weight polymer material. Furthermore, the external position of the polymer layers provides enhanced corrosion and abrasion resistance relative to prior art metal pipes. The incorporation of the polymer material additionally results in a lower overall material cost for manufacturing the pipe and also yields a structurally stronger pipe when compared to conventional metal pipes.

According to one embodiment, there is provided a composite pipe including a wall formed of a composite sheet including a metal layer having a first surface and an opposing second surface. A first polymer layer extends over the first surface and defines a first external surface. A second polymer layer extends over the second surface and defines a second external surface. The wall includes a wall thickness equal to the distance between the first and second external surfaces, wherein the first and second polymer layers comprise at least 30% of the wall thickness. The wall is disposed about a pipe axis to define a pipe opening extending longitudinally along the pipe.

The metal layer preferably includes strengthening elements formed therein, such as corrugations or ribs. The metal layer may be formed from high-strength low alloy (HSLA) steel and may define a thickness equal to approximately 60 mils.

The polymer layers may be formed of ultrahigh molecular weight high density polyethylene. The polymer layers may be of a similar thickness, or may have varying thicknesses. The polymer layers may each define a thickness of approximately 20 mils.

According to another embodiment, there is provided a method of forming a composite pipe. The method includes providing a metal sheet having a first surface and an opposing second surface. The metal sheet is formed around a central pipe axis to form a longitudinal pipe opening. A first polymer layer is applied over the first surface, with the first polymer layer defining a first external surface. Likewise, a second polymer layer is applied over the second surface, with the second polymer layer defining a second external surface. The metal layer, first polymer layer, and the second polymer layer collectively form a composite pipe wall having a wall thickness equal to the distance between the first and second external surfaces. The first and second polymer layers form at least 30% of the wall thickness.

The steps of applying the first polymer layer over the first surface and applying the second polymer layer over the second surface may occur before the step of forming the metal sheet around the central pipe axis. Alternatively, the steps of applying the first polymer layer over the first surface and applying the second polymer layer over the second surface may occur after the step of forming the metal sheet around the central pipe axis.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION OF THE INVENTION

The detailed description set forth below in connection with the appended drawings is intended as a description of certain embodiments of a composite pipe structure and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now drawings, wherein the showings are for purposes of illustrating a preferred embodiment of the present invention and are not for purposes of limiting the same, there is depicted a corrugated underground pipe system 10 formed using a composite pipe structure 12 (see FIGS. 2 and 3) including a steel core 14 interposed between a pair of polymer layers 16, 18. The composite nature of the pipe structure 12 utilizes less steel than conventional steel pipes, which results in a pipe that weighs less than conventional pipes and is also less expensive to manufacture than conventional steel pipes. The composite structure of the pipe also provides enhanced corrosion resistance, enhanced abrasion resistance, and enhanced structural strength relative to conventional steel pipes.

Figure 1:
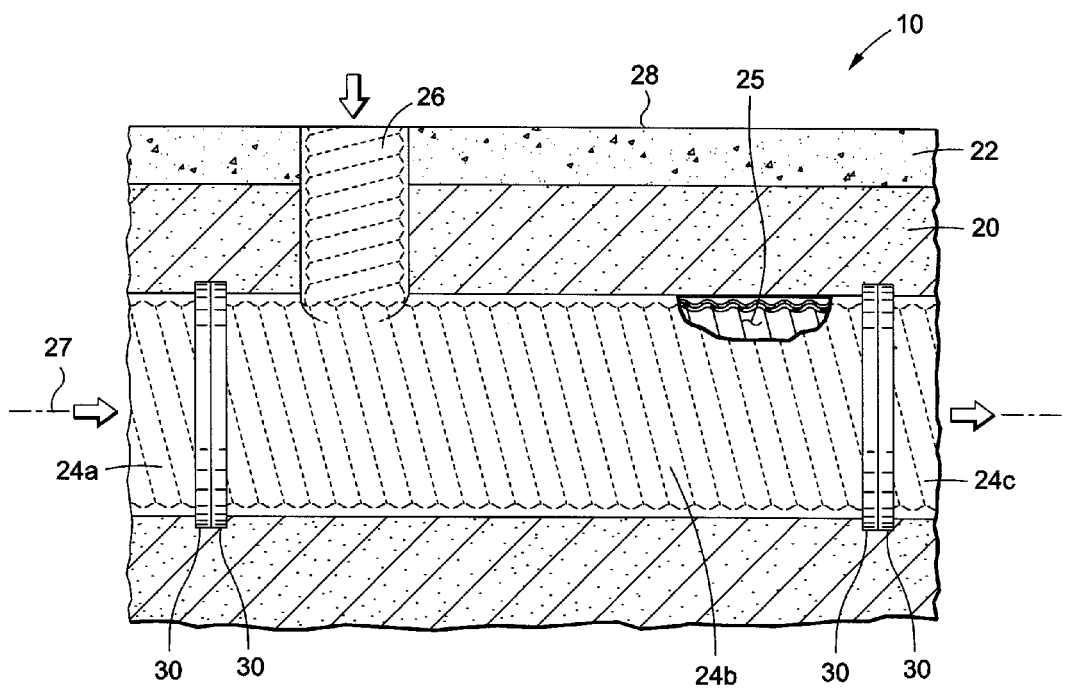
FIG. 1 is a side view of an underground pipe system constructed using a composite pipe structure according to an embodiment of the present invention.

Referring now specifically to FIG. 1, there is shown a side sectional view of an underground pipe system 10. Those skilled in the art will recognize that underground pipe systems 10 are readily employed for storm drain applications, sewer applications, penstocks, culverts and other low head applications. The pipe system 10 is buried within an underground layer 20, which resides below a topsoil layer 22, and includes a series of fluidly connected primary pipes 24a-c located within the underground layer 20. At least one drain pipe 26 is interconnected to the primary pipes 24a-c, which extends upwardly through the underground layer and topsoil layer 22 to the surface 28. In this respect, fluids from the surface 28 may be communicated into the pipes 24a-c via the drain pipe 26. Any number of drain pipes 26 may be used to effectively drain fluid from the surface 28 and into the underground primary pipes 24a-c.

Each primary pipe 24a-c includes an opening 25 disposed about a longitudinal axis 27 to define an internal fluid passageway that is fluidly coupled to at least one adjacent pipe 24a-c to allow for fluid communication therebetween. To that end, the primary pipes 24a-c may be formed with a flanged end portion 30, which is placed in abutting relation with a corresponding flanged end portion 30 on an adjacent pipe so as to establish fluid communication therebetween. Although the exemplary embodiment shows interconnection of adjacent pipes 24a-c through the use of the flanged end portions 30, it is understood that adjacent pipes 24a-c may be adjoined using any technique known by those having skill in the art.

Each primary pipe 24a-c includes a pipe wall 29 formed of the composite pipe structure 12 and disposed about the central longitudinal axis 27 so as to define the internal fluid passageway. The pipe wall 29 includes at least one strengthening element 31 formed therein. The exemplary pipes 24a-c depicted in FIGS. 1 and 2 include strengthening elements 31 in the form of corrugations which extend helically about the pipes 24a-c, 26 to strengthen the pipes 24a-c, 26. Although the exemplary embodiment includes corrugated pipes, it is also understood that other embodiments of the composite pipe structure 12 disclosed herein may also be used for forming spiral ribbed pipe, in which case, the strengthening element 31 is in the form of a rib.

Figure 2:
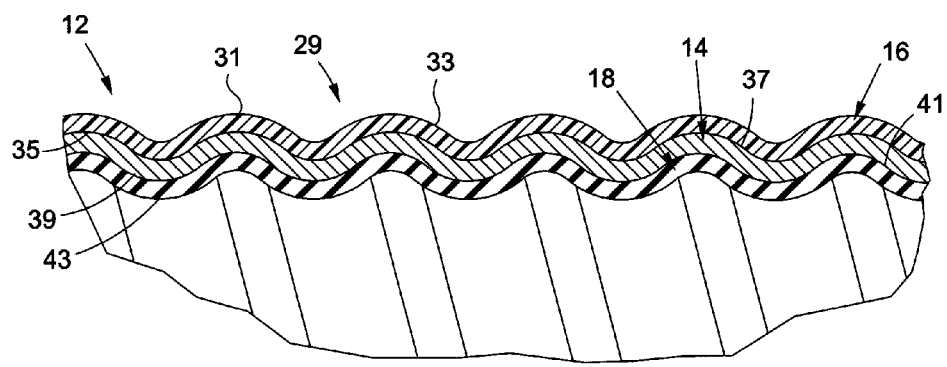
FIG. 2 is an enlarged side sectional view of the composite pipe structure used to form the pipe system depicted in FIG. 1.
Figure 3:
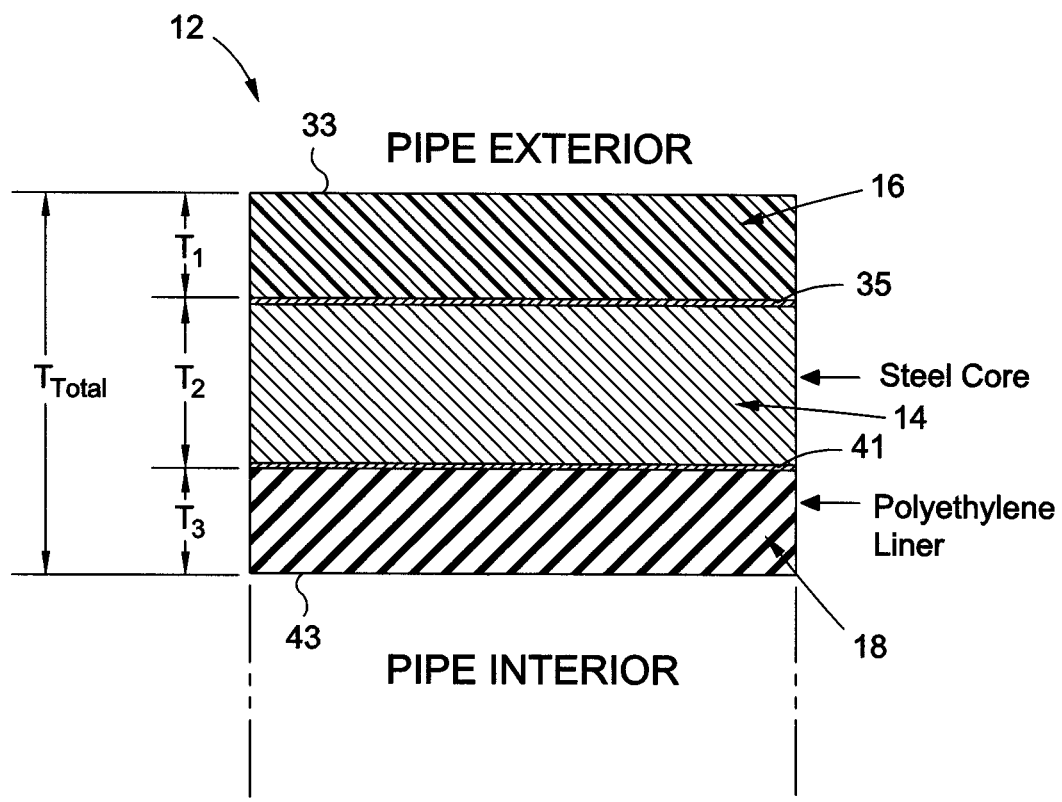
FIG. 3 is a schematic cross sectional view of the multi-layered composite structure used to form the pipe system depicted in FIG. 1.

FIG. 2 shows an enlarged cross section of the corrugated composite pipe wall 29, while FIG. 3 shows a schematic cross section of the composite layers which constitute the pipe wall 29. As shown, the composite pipe structure 12 generally includes an outer polymer layer 16 having a first surface 33 and an opposing second surface 35, a central steel layer 14 having a first surface 37 and an opposing second surface 39, and an inner polymer layer 18 having a first surface 41 and an opposing second surface 43. The outer polymer layer has a thickness $T_1$, (see FIG. 3) equal to the distance between the first and second surfaces 33, 35. The central steel layer 14 has a thickness $T_2$, equal to the distance between the first surface 37 and the second surface 39. The inner polymer layer 18 having a thickness $T_3$ equal to the distance between the first surface 41 and the second surface 43. The outer polymer layer 16, the central steel layer 14, and the inner polymer layer 18 collectively define a total thickness of the pipe wall, $T_{total}$ (i.e., the thickness from the inner surface 43 of the inner polymer layer 18 to the outer surface 33 of the outer polymer layer 16). According to a preferred embodiment, the pipe wall 29 has a total thickness, $T_{total}$ substantially equal to 100 mils. In this respect, the sum of $T_1$, $T_2$, and $T_3$ is preferably substantially equal to 100 mils, although it is understood that the sum may be greater than 100 mils or less than 100 mils without departing from the spirit and scope of the present invention.

In one embodiment, the central steel layer 14 is formed of high-strength low-alloy (HSLA) steel and defines a thickness $T_2$ substantially equal to 60 mils. The central steel layer 14 may be galvanized, and thus, include layers of zinc on the opposed faces thereof. The zinc layers may be included in the thickness $T_2$. Other metallic materials known in the art may also be used for forming the central layer 14.

Both of the polymer layers 16, 18 are preferably formed from ultrahigh molecular weight high-density polyethylene (UHMW HDPE) and may each be of a thickness that is 16-30 mils. The polymer layers 16, 18 may also be formed of other polymer materials known in the art, such as Polypropylene or a HDP co-polymer blend. In this respect, the polymer layers 16, 18 may be formed of the same polymer material or different polymer materials. The outer and inner polymer layers 16, 18 may be of the same thickness (such as 20 mils), or alternatively, be of differing thicknesses. For instance, the outer polymer layer 16 may be thicker than the inner polymer layer 18, and vice versa. As noted above, the preferred total thickness $T_{total}$ is equal to 100 mils, and thus, in embodiments having a central thickness $T_2$ substantially equal to 60 mils, the thicknesses $T_1$ and $T_3$ of the outer and inner polymer layers 16, 18, respectively, are collectively equal to 40 mils.

The aforementioned dimensions are exemplary in nature only and it is understood that other pipes may be formed with different dimensions. In this respect, the central thicknesses $T_2$ is approximately equal to 40%-60% of $T_{total}$, while $T_1$ and $T_3$ collectively comprise the remaining balance. In one embodiment, $T_1$ and $T_3$ are equal to each other, although in other embodiments, $T_1$ and $T_3$ are different.

There are several benefits associated with the composite construction of the pipe wall 29. One particular benefit is that the polymer layers 16, 18 protect the central metallic layer 14 against abrasion from medium flowing through pipe. For instance, a fluid flowing through the pipe may include rocks, gravel or other debris suspended therein, which may scratch an exposed metal surface. However, since the pipe includes an inner polymer layer 18 which covers the central metal layer 14, the pipe is less susceptible to corrosion caused by the passage of such debris through the pipe. The pipe offers similar protection on the outer surface. Along these lines, since the pipe is typically buried underground, the outer polymer layer 16 protects the pipe when the pipe is backfilled with dirt, gravel, etc. Conventional pipes having a metallic exterior oftentimes become scratched during the backfilling processes. However, the outer polymer layer 16 covers the central metallic layer 14 to protect the metal during the backfilling process. The substitution of metal with polymer also reduces the overall weight of the pipe.

The process of constructing the complete corrugated pipe 24a-c generally includes the step of corrugating the pipe material, and then passing the corrugated pipe material through a pipe milling machine which helically rolls the corrugated material into the final pipe shape.

The process of bonding the outer and inner polymer layers 16, 18 to the central steel layer 14 may be done at any point during the construction of the pipe 24a-c. In this respect, the outer and inner polymer layers 16, 18 may be bonded to the steel layer 14 before the steel layer 14 is corrugated. Alternatively, the outer and inner polymer layers 16, 18 may be bonded to the steel layer 14 after the steel layer 14 is corrugated, but prior to rolling the corrugated steel into an enclosed pipe. In yet another embodiment, the outer and inner polymer layers 16, 18 are bonded to the steel layer 14 after the steel layer 14 has been rolled into an enclosed pipe configuration.

According to one embodiment, the outer and inner polymer layers 16, 18 are extruded onto the steel layer 14. In particular, the outer polymer layer 16 is extruded over the first surface 37 of the steel layer 14, while the inner polymer layer 18 is extruded over the second surface 39. However, it is understood that other methods known in the art of applying and bonding the polymer layers 16, 18 to the steel layer 14 may be used without departing from the spirit and scope of the present invention.

The composite structure 12 of the pipe 24a-c substitutes a portion of the steel used in conventional steel pipes with polymer materials on both the outside and inside of the pipe 24a-c. In this respect, the polymer layers 16, 18 are not simply "coatings," but instead are thick layers which contribute to the overall structural strength of the pipe 24a-c. In other words, the polymer layers 16, 18 are of sufficient thickness so as to provide structural support to the pipe 24a-c. The polymer layers 16, 18 are lighter in weight than the steel 14, and thus, the overall weight of the pipe 24a-c is reduced by using the composite structure 12. Furthermore, the polymer layers 16, 18 protect the steel 14 which results in the pipe 24a-c being more resistant to corrosion or abrasion. The polymer materials used also tend to be less expensive than the steel 14, which results in a less expensive overall cost in manufacturing the pipe.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A composite pipe comprising:
   a wall formed of a composite sheet having:
   a metal layer having a first surface and an opposing second surface;
   a first polymer layer extending over the first surface and defining a first external surface; and
   a second polymer layer extending over the second surface and defining a second external surface, the wall having a wall thickness equal to the distance between the first and second external surfaces, the first and second polymer layers comprising at least 30% of the wall thickness;
   the wall being disposed about a pipe axis to define a pipe opening extending longitudinally along the pipe;
   the wall including at least one strengthening element formed therein and extending helically along the composite pipe;
   the composite pipe being adapted to allow for burying of the composite pipe underground.

2. The composite pipe recited in claim 1, wherein the wall thickness is equal to approximately 100 mils.

3. The composite pipe recited in claim 2, wherein the metal layer is of a metal layer thickness equal to the distance between the first and second surfaces thereof, the metal layer thickness being equal to approximately 60 mils.

4. The composite pipe recited in claim 3, wherein first polymer layer is of a first polymer thickness equal to the distance between the first external surface and the first surface of the metal layer, and the second polymer layer is of a second polymer thickness equal to the distance between the second external surface and the second surface of the metal layer, the first polymer thickness and second polymer thickness each being within the range of approximately 16-30 mils.

5. The composite pipe recited in claim 4, wherein the first polymer thickness and the second polymer thickness are substantially equal to each other.

6. The composite pipe recited in claim 4, wherein the first polymer thickness differs from the second polymer thickness.

7. The composite pipe recited in claim 1, wherein the metal layer is formed from high-strength low-alloy steel.

8. The composite pipe recited in claim 1, wherein at least one of the first polymer layer and the second polymer layer is formed from ultrahigh molecular weight high density polyethylene.

9. The composite pipe recited in claim 1, wherein the first polymer layer and the second polymer layer are formed from different polymer materials.

10. The composite pipe recited in claim 1, wherein the at least one strengthening element includes a corrugation, the corrugation being formed at least partially by an exposed surface of the first polymer layer and an exposed surface of the second polymer layer.

11. A method of forming a composite pipe, the method comprising the steps of:
   forming a metal sheet around a central pipe axis to form a longitudinal pipe opening, the metal sheet having a first surface and an opposing second surface;
   applying a first polymer layer over the first surface, the first polymer layer defining a first external surface;
   applying a second polymer layer over the second surface, the second polymer layer defining a second external surface, the metal layer, first polymer layer and the second polymer layer collectively forming a composite pipe wall adapted to be buried underground and having a wall thickness equal to the distance between the first and second external surfaces, the first and second polymer layers forming at least 30% of the wall thickness; and
   forming at least one strengthening element within the metal sheet, with the at least one strengthening element being formed at least partially by the first external surface and the second external surface, the at least one strengthening element being formed such that when the metal sheet is formed about the central pipe axis, the at least one strengthening element extends helically about the central pipe axis.

12. The method recited in claim 11, wherein the steps of applying the first polymer layer over the first surface and applying the second polymer layer over the second surface occur before the step of forming the metal sheet around the central pipe axis.

13. The method recited in claim 11, wherein the steps of applying the first polymer layer over the first surface and applying the second polymer layer over the second surface occur after the step of forming the metal sheet around the central pipe axis.

14. The method recited in claim 11, wherein the wall thickness is equal to approximately 100 mils.

15. The method recited in claim 14, wherein the metal sheet is of a metal sheet thickness equal to the distance between the first and second surfaces thereof, the metal sheet thickness being equal to approximately 60 mils.

16. The method recited in claim 15, wherein first polymer layer is of a first polymer thickness equal to the distance between the first external surface and the first surface of the metal sheet, and the second polymer layer is of a second polymer thickness equal to the distance between the second external surface and the second surface of the metal sheet, the first polymer thickness and second polymer thickness each being within the range of approximately 16-30 mils.

17. The method recited in claim 16, wherein the first polymer thickness and the second polymer thickness are substantially equal to each other.

18. The method recited in claim 16, wherein the first polymer thickness differs from the second polymer thickness.

* * * * *